United States Patent Office 3,740,333
Patented June 19, 1973

3,740,333
COMPOSITIONS USEFUL AS SPERM OIL SUBSTITUTES
Robert B. Hutchinson and Karl P. Kammann, Jr., Cincinnati, Ohio, assignors to Emery Industries, Inc., Cincinnati, Ohio
No Drawing. Filed June 28, 1971, Ser. No. 157,720
Int. Cl. C10m 1/42, 1/20
U.S. Cl. 252—48.6                                14 Claims

ABSTRACT OF THE DISCLOSURE

Compositions useful per se and in the sulfurized form as substitutes for sperm oil are provided. The compositions are blends of triglycerides and wax esters derived from predominantly $C_{18-22}$ unsaturated acids and $C_{10-16}$ saturated alcohols.

BACKGROUND OF THE INVENTION

The recent addition of the sperm whale to the "endangered species" list by the United States Department of Interior has resulted in a ban on the importation of sperm oil into the United States. It would therefore be desirable to have available a synthetic sperm oil composition having essentially the same physical characteristics and which could be substituted for the natural product, per se, and in its sulfurized form, including forms also containing chlorine and phosphorous.

Sperm oil is substantially different from other natural oils and its unique characteristics make it useful as a lubricant under conditions where other lubricants fail, such as where extreme heat and pressure are encountered. Sperm oil is nondrying and not subject to gum formation and rancidity. Sulfurized sperm oil has especially useful properties and is used extensively as lubricant additives. Natural sperm oil consists of a complex mixture of triglycerides and various mono-esters (wax esters). The predominant wax esters are long-chain fatty esters which contain unsaturation in both the alcohol and acid portions of the molecule. While the predominant fatty acid ester could be duplicated and the overall sperm oil composition essentially duplicated, it would be impractical and very costly and preclude the use of such a synthetic sperm oil for all but specialty applications. It would be far more practical rather than to exactly duplicate natural sperm oil to find a suitable substitute which would perform similarly and have essentially the same physical characteristics. For a composition to be a suitable sperm oil substitute it should have an iodine value (I.V.), pour point and cloud point comparable to that of natural sperm oil and have similar lubricating efficiency both in the sulfurized and unsulfurized state. It should also have a similar viscosity temperature relationship in both the sulfurized and unsulfurized forms.

SUMMARY OF THE INVENTION

We have now found compositions which are suitable substitutes for natural sperm oil and which have very similar physical characteristics to the natural product. The present compositions are useful in all applications where the natural sperm oil has heretofore been employed.

Quite unexpectedly, we have now found that wax esters derived from a mixture of unsaturated $C_{18}$ fatty acids and saturated alcohols blended with triglycerides give compositions useful as substitutes for natural sperm oil. The acid portion of the wax ester is preferably derived from a mixture of oleic and linoleic acids with the alcohol generally being $C_{10-16}$ alcohols or mixtures thereof containing up to about 40% branched alcohols. Wax esters prepared from tall oil fatty acids are especially useful. The preferred triglyceride is lard oil or pigskin grease. Compositions of this invention will contain from about 5 to 50% by weight triglyceride and 50 to 95% by weight wax ester.

The physical characteristics of the compositions of this invention including iodine value, cloud point and pour point are comparable to the natural product and these compositions perform identically and in some instances are superior to natural sperm oil as lubricant additives.

DETAILED DESCRIPTION

The useful compositions of the present invention are obtained by blending specific wax esters and triglycerides in definite proportions as will be defined below.

The particular wax esters are monoesters derived from unsaturated fatty acids containing 18, 20 or 22 carbon atoms. Such unsaturated fatty acids include cis-9-octadeconic acid (oleic acid), cis-9, cis-12-ocetadecadienoic acid (linoleic acid), cis-11-eicosenoic, cis-13-docosenoic, docosadienoic and the like, with the $C_{18}$ fatty acids, oleic and linoleic, being preferred as the predominant acid component. The fatty acid will preferably contain one or two carbon-carbon double bonds per molecule but acids having a higher degree of unsaturation such as linoleic acid may also be present in amounts up to about 10%. Since mixtures of fatty acids obtained from various oils are most often employed, it will be sufficient if the average number of carbon-carbon double bonds per molecule of fatty acid range between one and two. For example, if equimolar amounts of oleic and linoleic acid are combined, the average number of carbon-carbon double bonds per molecule would be 1.5. Excellent results are obtained when the average number of carbon-carbon double bonds is between about 1.25 and 1.75.

While the pure acids may be employed and admixed in various proportions to obtain the desired amount of unsaturation (1 to 2 $>$C$=$C$<$ per fatty acid molecule), considerable economic advantage will be realized by the use of certain acid mixtures which may be recovered from various oils. These acid mixtures may be employed directly to form the ester or may be further admixed with one or more $C_{18-22}$ unsaturated fatty acids. Useful fatty acid mixtures of this type which may be advantageously employed include those obtained from tall oil, almond oil, apricot kernel oil, olive oil, rapeseed oil, crambe oil, poppyseed, sorghum oil, walnut oil, soybean oil, teaseed oil and the like. Tall oil-derived fatty acids are especially useful since they typically contain 90% or more oleic and linoleic acids present in approximately equimolar amounts. The small amounts of other acids, both saturated or unsaturated, which may be present from the tall oil do not adversely affect the compositions of the present inveniton.

The fatty acid composition will contain at least 80% by weight, and more preferably greater than 90% by weight of the mono- and di-unsaturated acid components. Saturated acids and other impurities such as rosin acids, while they do not interfere with the properties of the present compositions if present in small amounts, should be avoided in large amounts for best results. The amount of saturated acid and rosin acid impurities present in the fatty acid should in no event exceed about 10% by weight and it is more preferable that the combined amount of these impurities not exceed 5% by weight in the unsaturated fatty acid mixture. Rosin acid contents greater than about 2% have a marked adverse effect on the cloud points of the resulting wax ester/triglyceride blends. Tall oil fatty acids having an iodine value 120–140 and an acid value of 190–205 are especially useful for the preparation of the wax esters of the present invention.

The alcohols employed with the unsaturated fatty acids to obtain the wax esters are saturated primary alcohols containing from about 6 to about 20 carbon atoms. Best results are obtained when the saturated alcohol contains about 10 to 16 carbon atoms. If too low a molecular weight alcohol is used the resulting blends have high flash points and low viscosities and are less desirable. If too high a molecular weight alcohol is employed insoluble precipitates are formed and the cloud point of the resulting wax ester/triglyceride blend is unacceptable. It is possible to employ the $C_{16}$ to $C_{20}$ alcohols without adversely affecting the cloud point if the linoleic acid content is increased so that the average number of $>C=C<$ per fatty acid molecule ranges between about 1.75 and 2.0.

The saturated alcohols may be straight chain or contain branching. Multiple branching within the alcohol molecule is possible. The cloud point and pour point of the compositions are lowered by using alcohols containing some branching without adversely affecting the other properties of the composition. In general, the amount of branched-chain alcohols will not exceed about 40% by weight of the total alcohol composition. The branching may be present at any point along the alcohol chain, however, based primarily on availability alcohols obtained by the oxo process which are branched in the alpha position are especially useful.

The formation of the wax esters is conveniently carried out by reacting the unsaturated fatty acid and the alcohol under normal esterification conditions. The mode of preparation is not crucial and any of the known processes, with or without catalysts, may be employed. Depending on the particular process employed, the wax ester may be used directly as it is obtained from the reactor or may be subjected to stripping or distillation to remove undesirable excess reactants and the like.

The wax esters described above are blended with one or more glyceryl esters of fatty acids to obtain the sperm oil substitutes of the present invention. The fatty acid portion of the glycerides may be derived from a single fatty acid or from a mixture of fatty acids consisting predominantly of fatty acids containing between about 14 and 22 carbon atoms. The glycerides may include mono-, di- and triesters but generally contain 75% or more by weight of the triglyceride. Useful triglycerides (hereinafter understood to include mono, di- and triesters of glycerol) include fats and fatty oils derived from plants and animals and have iodine values between about 50 and 120 and more preferably between about 65 and 100. Useful vegetable and animal fats and oils which may be blended in definite proportions with the wax esters include almond oil, apricot kernel oil, corn oil, cottonseed oil, lard oil, pigskin grease, mowrah oil, mustardseed oil, neatsfoot oil, olive oil, peanut oil, rice bran oil, sesame oil, sorghum oil, soybean oil, wheatgerm oil, rapeseed oil, crambe oil, and the like. Based on availability and performance characteristics lard oil and pigskin grease are especially preferred triglycerides. Lard oil having an iodine value between about 65 and 80 gives compositions having excellent lubricating properties, both in sulfurized and unsulfurized form. Lard oil is a mixed triglyceride derived predominantly from $C_{16}$ and $C_{18}$ saturated fatty acids and $C_{18}$ mono- and diunsaturated fatty acids.

In addition to natural fats and oils, the triglyceride may also be synthesized by the reaction of glycerine and fatty acids such as oleic or tall oil fatty acids. This esterification may either be carried out separately or along with the wax ester, for example, by esterifying tall oil fatty acids with both alcohol and glycerine. Any small amounts of mono- and diglycerides in the product from such a method have no deleterious effects.

The compositions of the present invention useful as substitutes for natural sperm oil contain from about 5% to 50% by weight of the triglyceride and about 50% to 95% by weight of the wax ester. The specific type of wax ester and triglyceride and the relative proportions of each employed are determined from a consideration of the particular characteristics desired in the end product. In general, the final composition will have an iodine value between about 70 and 100 and a maximum pour point and cloud point of 45° F. and 65° F., respectively, and the wax ester and triglyceride may be varied accordingly to produce suitable compositions having properties within these ranges. Excellent results have been obtained when the wax ester comprises about 55% to 85% by weight of the overall composition with about 15% to 45% by weight triglyceride. Compositions having exceptional lubricant properties, both sulfurized and unsulfurized, are obtained when about 15% to 45% by weight lard oil or pigskin grease is combined with about 55% to 85% by weight of a wax ester derived from tall oil fatty acids containing 90% or more oleic and linoleic acids with a $C_{10-16}$ saturated alcohol.

The compositions obtained by blending the wax ester and triglyceride may be employed, per se, as lubricants for other applications, or sulfur may be introduced into the composition by means of reaction with sulfur, sulfur halide or phosphorous sulfides. Such sulfurized, sulfur-chlorinated and sulfur-phosphorized compositions find many uses as additives to lubricants such as greases and metal-cutting oils. Any of the conventional known means of introducing sulfur into natural sperm oil may also be employed with the compositions described herein. Sulfur contents up to about 16% by weight are possible by these various means if corrosion to copper is not a problem for the particular application desired, however, if a product which is noncorrosive to copper is desired it is most advantageous if the sulfur content ranges between about 9% and 11% by weight.

One common method for sulfurizing the compositions is to heat the mixture at a temperature of about 300 to 400° F. in the presence of molten sulfur. The molten sulfur may be added continuously or incrementally throughout the course of the reaction in order to control the heat of reaction. Catalysts such as zinc oxide or various amines may be employed. Numerous modifications of the sulfurization processes such as conducting the reaction in the presence of an added amount of water such as described in U.S. Pat. 2,644,810 or post-treatment of the sulfurized material with phosphorous sulfides, such as phosphorous sesquisulfide, to produce a complex phosphorized and sulfurized material as described in U.S. Pats. 2,211,231 and 2,211,306 are also possible. Also it is possible to initially react the substitute sperm oil composition with phosphorous sulfides such as phosphorous pentasulfide or phosphorous sesquisulfide such as described in U.S. Pat. 2,441,587. Sulfur-chlorinated materials may be obtained by the nearly quantitative addition of sulfur monochloride at temperatures up to about 150° F. Sulfur contents up to about 8% by weight of sulfur are possible using such processes. The sulfurized and sulfur-chlorinated concentrates may be used as such but are generally blended with other petroleum-based lubricants such as mineral oil.

The following examples serve to describe the invention more fully, however, they are merely intended as illustrative of the invention and are not to be construed as any limitation thereon. In the examples all parts and percentages are on a weight basis unless otherwise indicated.

EXAMPLE I

Preparation of wax ester 1335 grams of a mixture of saturated alcohols (80% normal alcohols) comprised of 5% $C_{11}$, 25% $C_{12}$, 25% $C_{13}$, 25% $C_{14}$ and 20% $C_{15}$ alcohols having a hydroxyl value of 272 and an average molecular weight of 205 was reacted with 2228 grams tall oil fatty acids (52% oleic acid, 46% linoleic acid and about 1% each rosin acids and stearic acid) at a temperature of 250° C. for 3½ hours. The reaction product was stripped by heating to 255° C. at 1 mm. Hg and holding at 255° C. for 5 minutes. The resulting wax ester had an acid value of 8.1 and a hydroxyl value of 3.0.

Preparation of substitute sperm oil composition 71 parts by weight of the wax ester prepared above was blended with 29 parts by weight lard oil (Larex Extra No. 1) having an iodine value of 71.0. The physical properties of the wax ester/lard oil blend are set forth below and compared with typical specifications or characteristics for natural commercial sperm oil.

|  | Wax ester/lard oil blend | Natural sperm oil |
|---|---|---|
| Iodine value | 78.5 | 78–88 |
| Acid value | 12.2 | 4 |
| Saponification value | 143.8 | 120–140 |
| Unsaps, percent | 32 | 35–42 |
| FAC color | 7 | 1 11 |
| Pour point, °F | 24 | 1 45 |
| Cloud point, °F | 44 | 1 55 |
| Smoke point, °F | 340 | 275–325 |
| Specific gravity | 0.882 | 0.881–0.885 |
| SUS viscosity at 100° F | 100.3 | 95–105 |

¹ Max.

Another property reported to be one of the reasons for the value of natural sperm oil in many applications is the relatively small change of viscosity with temperature or the ability to maintain relatively high viscosities. The 210° F. SUS viscosity of the wax ester/lard oil blend was 43.2 which compared favorably with the 45.5 value obtained with a particular sperm oil sample.

The properties of the synthetic sperm oil obtained by blending the wax ester and lard oil are nearly identical in all instances to those of the natural product. If desired, the acid value reported for the synthetic composition can be reduced to meet the specification of the commercial sperm oil with little or no change in the other useful properties of the composition.

Sulfurization of wax ester/lard oil blend

A 200 gram sample of the wax ester/lard oil blend prepared above was stirred at 170° C. with 4.5 grams iron filings. Incremental additions of sulfur were made to the reaction mixture at 5-minute intervals for 2½ hours until 28.6 grams sulfur had been added. The mixture was then heated at 199° C. for 2 hours after which time the temperature was decreased to 173° C. and air-blowing of the reaction mixture commenced. During the air-blowing the temperature was allowed to gradually drop to 149° C. over 1½ hours, to 121° C. over another hour period and finally to 93° C. during the final 30 minutes. The filtered product contained 10.2% bound sulfur.

9.8 grams of the sulfurized wax ester/lard oil blend were mixed with 190.2 grams 100 SUS mineral oil. The resulting blend, identified as Sample A, contained 0.5% sulfur.

Sulfur-chlorination of wax ester/lard oil blend 168 grams of the wax ester/lard oil blend prepared above charged to a 500 ml. reactor and heated to about 59° C. Sulfur monochloride was then added at a slow rate over 2¼ hours. The total amount of sulfur monochloride charged was 32 grams. The temperature was then raised to about 65° C. and air-blown for a 4-hour period until the product was "bland," that is, free of any sharp odor due to residual sulfur, sulfur monochloride, hydrogen chloride and hydrogen sulfide. The product contained 6.8% sulfur and 5.8% chlorine upon analysis. Ten grams of the sulfur-chlorinated material was blended with 190 grams 100 SUS mineral oil to obtain a 5% blend and identified as Sample B.

Physical testing of lubricant compositions

Samples A and B were evaluated to demonstrate their lubricating abilities and Sample A compared against similarly sulfurized natural sperm oil composition which was also blended with 100 SUS mineral oil to 0.5% sulfur. The tests were conducted with a Falex machine which provides a convenient and reliable means to determine the film strength or load-carrying properties of materials as extreme pressure (EP) lubricants. Falex testing is recognized throughout the industry as a means of measuring the relatively effectiveness of various lubricants. Two tests were conducted with the Falex machine. The first test, referred to as the wear test (ASTM D–2670–67) is conducted at 1000 lb. load for one hour. Zero teeth indicates no wear and the higher the number of teeth recorded the greater the amount of wear and the less desirable the lubricant composition. In some instances a lubricant blend shows a sudden and rapid failure before the hour is completed—these blends are reported to have "failed" and the time for such failure noted. The second test conducted with the Falex machine is referred to as the EP test. In this test the machine is run at various loads in increments of 250 lbs. for one minute at each load setting. If the lubricant does not fail at a lower load setting the load is increased and the procedure is repeated until failure. In some instances the lubricant will fail between two load settings as the load is being increased and is therefore reported as a range. Test results were as follows:

| Lubricant composition | Falex EP test (lbs. at failure) | Falex wear test (teeth in one hour) |
|---|---|---|
| Sample A | 1,250–1,500 | 13 |
| Sample B | 2,500 | 7 |
| Sulfurized natural sperm oil | 1,250 | ¹ Failed |

¹ 25 min.

In addition to tests to demonstrate the lubricating ability of the compositions of the present invention various other tests were performed. A thermal stability test of the sulfurized wax ester/lard oil concentrate was conducted employing thermogravimetric analysis (TGA) and compared against the sulfurized natural sperm oil concentrate. This test shows the weight percent of a sample remaining as the sample is heated at a rate of 10° C. per minute. At 200° C. neither the sulfurized natural sperm oil or the sulfurized wax ester/lard oil showed any weight loss and at 250° C. both samples had only lost 1% of their original weight. In another test of thermal stability, when the sulfurized wax ester/lard oil concentrate was heated under nitrogen for 4 hours at 205° C. the acid value increased only 0.6. Sample A was also tested in accordance with ASTM D–130 and proved to be non-corrosive to copper. No rusting was visible after 24 hours when Sample A was tested in accordance with ASTM D–665. The wax ester/lard oil blend, the sulfurized wax ester/lard oil concentrate and blend with mineral oil all performed comparably to the comparable natural sperm oil compositions and in some instances had even more desirable physical characteristics than the natural product.

EXAMPLE II

As described in Example I, a wax ester was prepared from 250.8 grams tall oil fatty acid and 113.0 grams of a 75:25 mixture of $C_{10}$ and $C_{12}$ alcohols containing about 15% branched alcohols. The wax ester so produced was blended with lard oil (71:29 weight ratio) and the resulitng composition had the following properties: cloud point 44° F.; pour point 21° F.; smoke point 345° F.; iodine value 79.7 and SUS viscosity at 100° F. 92.3.

The wax ester/lard oil blend (150 grams) was sulfurized as described in Example I and the product contained 9.0% bound sulfur. The sulfurized material blended as before with mineral oil was evaluated in the Falex EP test and withstood 1500 lb. load before failure. Similarly in the Falex wear test the sulfurized product showed superior performance to sulfurized natural sperm oil. The blend with mineral oil has viscosities of 121.1 and 40.4 SUS at 100° F. and 210° F., respectively, compared with values of 125.0 and 40.0 SUS for a similar blend of sulfurized natural sperm oil. Thus the substitute compared favorably with the natural sperm oil in the respect that relatively high viscosities are maintained at higher temperatures.

EXAMPLE III

Wax esters were prepared with the tall oil fatty acid of Example I but employing a variety of alcohols. The table below identifies the alcohols employed for the preparation of the wax ester and the cloud point, pour point and SUS viscosity at 100° F. obtained for the 71 wax ester: 29 lard oil blends.

| Product | Alcohol mixture | Cloud point (° F.) | Pour point (° F.) | SUS viscosity at 100° F. |
|---|---|---|---|---|
| A | $C_{14,16,18}$ alcohols (95% normal) | 68 | 45 | 112.8 |
| B | 70 parts $C_{14,16,18}$ (5% branched) and 30 parts $C_{10,12}$ (15% branched) alcohols. | 60 | 35 | 108.9 |
| C | $C_{11-15}$ normal alcohols | 60 | 28 | 102.3 |
| D | $C_{11-14}$ alcohols (39% branched) | 44 | 20 | 102.9 |
| E | $C_{13}$ alcohol (30% branched) | 40 | 31 | 97.3 |
| F | $C_{12,14}$ normal alcohols | 58 | 26 | 97.4 |
| G | $C_{16,18}$ normal alcohols | 74 | 68 | 117.5 |

Falex tests were performed for each of the various samples prepared above after sulfurization to about 9–10% S and blending with 100 SUS mineral oil to reduce the sulfur level to 0.5%. The results are as follows:

| Sample | Falex EP text | Falex wear test |
|---|---|---|
| A | 1,500–1,750 | 13 |
| B | 1,250–1,500 | 12 |
| C | 1,250–1,500 | 10 |
| D | 1,250 | [1] Failed |
| E | 1,500 | 15 |
| F | 1,250–1,500 | 29 |
| G | 1,250 | 12 |

[1] 30 min.

EXMPLE IV 71 parts of a wax ester prepared by reacting 200 grams tall oil fatty acids with 220 grams Alfol 1618 ( a commercially available alcohol containing about 36% $C_{16}$ and 62% $C_{18}$ normal alcohols) were blended with 29 parts glycerol trioleate. The resulting blend had an acid value of 4.7, an iodine value of 77.0 and pour point and cloud points of 48.5° F. and 68° F., respectively.

The blend (201.7 grams) was sulfurized by incremental addition of 28.8 grams sulfur in the presence of 2.25% iron powder at 175° C. over 2½ hours followed by additional heating for one hour after the final sulfur addition was made. Analysis indicated the product sulfurized by this method contained 12.2% sulfur (corrosive to copper). Dilution of the sulfurized material with 100 SUS mineral oil to 0.5% sulfur level gave a product which had SUS viscosities of 118.9 at 100° F. and 39.7 at 210° F. Falex EP test and wear test results were 2750 lbs. and 20 teeth, respectively.

EXAMPLE V

A fatty acid mixture (78% linoleic/28% oleic) was esterified with Alfol 1618 to obtain a wax ester which was then blended in a 71:29 weight ratio with lard oil. The resulting blend had an acid value of 12.2; iodine value of 85.0; pour point 52° F.; cloud point 60° F.; and 100° F. SUS viscosity of 117.4. The oil was then sulfurized in accordance with the procedure of Example IV to about 12% sulfur level and the sulfurized product diluted with 100 SUS mineral oil to 0.5% sulfur level and evaluated as a lubricant. The SUS viscosity of the lubricant at 100° F. and 210° F. was 118.0 and 39.9, respectively. The lubricant showed exceptional lubricity in the Falex EP test withstanding 2500 lbs. load before failure. After 1 hour at 1,000 lb. load in the Falex machine wear of only 16 teeth was recorded. Similarly sulfurized (12.2%) and blended natural sperm oil failed at 1250 lbs. in the Falex Ep test and showed over twice as much wear after 1 hour testing at 1000 lbs. as the composition of this invention.

We claim:
1. A composition of matter useful as a substitute for sperm oil comprising:
 (a) about 50 to 95% by weight of a wax ester derived from an unsaturated fatty acid containing 18–22 carbon atoms and a saturated alcohol containing 6–20 carbon atoms; and
 (b) from about 5 to 50% by weight of a triglyceride having an iodine value between about 50 and 120.
2. The composition of claim 1 having an iodine value between about 70 and 100, a pour point below about 45° F. and a cloud point below about 65° F. obtained by blending about 55 to 85% by weight wax ester with about 15 to 45% by weight triglyceride.
3. The composition of claim 2 wherein the wax ester is derived from tall oil fatty acids and saturated alcohols containing 10 to 16 carbon atoms with less than 40% branched-chain alcohols and the triglyceride is lard oil.
4. The composition of claim 1 sulfurized and containing up to about 16% bond sulfur.
5. The composition of claim 4 blended with mineral oil.
6. The composition of claim 1 sulfur-chlorinated and containing up to about 8% bound sulfur.
7. The composition of claim 6 blended with mineral oil.
8. The composition of claim 1 wherein the wax ester is derived from unsaturated fatty acids containing one or two carbon-carbon double bonds per molecule and a saturated alcohol containing from 10 to 16 carbon atoms and the triglyceride has an iodine value between about 65 and 100.
9. The composition of claim 8 containing about 15 to 45% by weight triglyceride selected from the group consisting of lard oil and pigskin grease.
10. The composition of claim 8 wherein the wax ester is derived from a mixture of oleic and linoleic acids present in a ratio such that the average number of carbon-carbon double bonds per molecule ranges between about 1.25 and 1.75 and a saturated alcohol containing less than about 40% by weight branched-chain alcohols.
11. The composition of claim 10 wherein the unsaturated fatty acids are obtained from oils the fatty acid portion of which contain 90% or more oleic and linoleic acids.
12. The composition of claim 11 containing about 15 to 45% by weight triglyceride selected from the group consisting of lard oil and pigskin grease.
13. The composition of claim 11 wherein the oil is tall oil.
14. The composition of claim 13 wherein oleic and linoleic acids are present in approximately equimolar amounts and the amount of saturated acid and rosin acid impurities present in the tall oil fatty acids are less than about 5% by weight.

References Cited

UNITED STATES PATENTS

| | | | |
|---|---|---|---|
| 3,298,954 | 1/1967 | Brown | 252—56 RX |
| 3,429,815 | 2/1969 | Drake | 252—56 RX |
| 3,446,739 | 5/1969 | Padayannopoulous et al. | 252—56 RX |
| 3,455,896 | 7/1969 | Den Herder et al. | 252—486 X |

CARL F. DEES, Primary Examiner

U.S. Cl. X.R.

252—56 R